(12) United States Patent
Hubble (10) Patent No.: US 11,326,964 B2
(45) Date of Patent: May 10, 2022

(54) LASER CALORIMETER BOARD

(71) Applicant: David O. Hubble, King George, VA (US)

(72) Inventor: David O. Hubble, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 159 days.

(21) Appl. No.: 16/842,950

(22) Filed: Apr. 8, 2020

(65) Prior Publication Data

US 2021/0318185 A1    Oct. 14, 2021

(51) Int. Cl.
| | |
|---|---|
| *G01K 15/00* | (2006.01) |
| *G01K 19/00* | (2006.01) |
| *G01K 17/00* | (2006.01) |
| *G01K 7/16* | (2006.01) |

(52) U.S. Cl.
CPC .............. *G01K 19/00* (2013.01); *G01K 7/16* (2013.01); *G01K 17/003* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,921,972 A | * | 1/1960 | Robert, I | G01J 5/12 |
| | | | | 136/214 |
| 4,436,437 A | * | 3/1984 | Beggs | G01K 17/003 |
| | | | | 374/32 |

FOREIGN PATENT DOCUMENTS

| | | | | |
|---|---|---|---|---|
| CN | 208235935 U | * | 12/2018 | E04G 9/02 |
| JP | 2015028658 A | * | 2/2015 | G02B 6/42 |

* cited by examiner

*Primary Examiner* — Lisa M Caputo
*Assistant Examiner* — Nasir U. Ahmed
(74) *Attorney, Agent, or Firm* — Gerhard W. Thielman (57) ABSTRACT

A calorimeter board is provided for power calibration of a laser emission. The board includes a flat metal plate, a sinuous groove and a resistance temperature detector wire. The flat metal plate has obverse and reverse surfaces separated by a thickness. The groove is cut into the reverse surface and penetrates to a depth being part of the thickness. The wire is disposed within the groove at the depth. The wire connects to an instrument that measures electrical resistance responsive to the laser emission on the obverse surface.

8 Claims, 14 Drawing Sheets

LASER CALORIMETER BOARD

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

CROSS REFERENCE TO RELATED APPLICATION

Pursuant to 35 U.S.C. § 119, the benefit of priority from provisional application 62/996,224, with a filing date of Jan. 27, 2020, is claimed for this non-provisional application.

BACKGROUND

The invention relates generally to calorimeters. In particular, the invention relates to a flat plate calorimeter for receiving and measuring radiant energy from lasers.

Exposure to high energy laser emission yields opportunities for direct energy weapons. Subjecting materials to such exposure enable empirical evaluation of survivability of military components. Accurate determination requires knowledge of the emissive power from these lasers, which necessitates calibration of the intensity of areas that receive these emissions.

SUMMARY

Conventional calorimeters yield disadvantages addressed by various exemplary embodiments of the present invention. In particular, various exemplary embodiments provide a flat plate calorimeter or "board" for power calibration of a laser emission. The board includes a flat metal plate, a sinuous groove and a resistance temperature detector wire. The flat metal plate has obverse and reverse surfaces separated by a thickness. The groove is cut into the reverse surface and penetrates to a depth being part of the thickness. The wire is disposed within the groove at the depth. The wire connects to an instrument that measures electrical resistance responsive to the laser emission on the obverse surface.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 18 is a graphical view of a laser emission correlation;

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in inches (in) and centimeters (cm), mass in pounds ($lb_m$) or kilograms (g), time in seconds (s), angles in degrees (°), temperature in degrees Celsius (° C.) or Kelvin (K), electric current in amperes (A), voltage potential in volts (V), resistance in ohms ($\Omega$), energy in joules (J) and power (energy per time) in watts (W). Supplemental measures can be derived from these, such as density in grams-per-cubic-centimeters ($g/cm^3$), resistivity in ohm-meters ($\Omega m$), intensity in watts-per-square-centimeter ($W/cm^2$) and the like.

Calibration of thermal energy absorbed can be accomplished by a calorimeter—a device that exhibits a known heat capacity, can receive power over a time interval and distribute that accumulated energy so as to exhibit a bulk measured temperature response. By correlating the rated emission energy of a thermal source, such as a laser illuminating the calorimeter as a target with its temperature response, one can accurately determine the power to an illuminated target test sample. Intensity (power-per-unit-area) can be derived based on calculations of area to the test sample.

Figure 1:
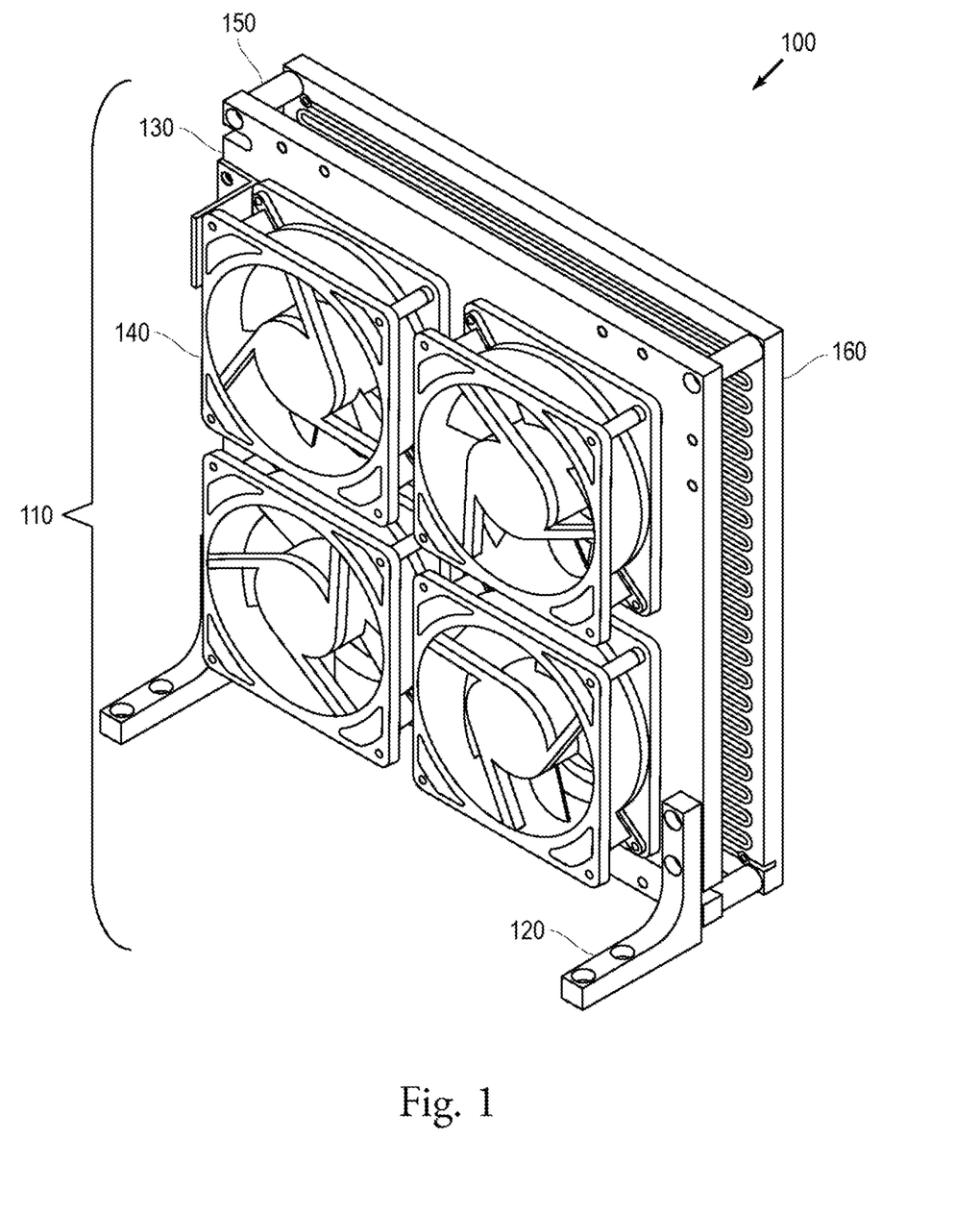
FIG. 1 is an isometric view of a calorimetric assembly.

FIG. 1 shows an isometric assembly view 100 of a thermal calorimetric assembly 110 for laser power calibration so as to illuminate a target sample to measure received power compared to established output power of the laser. A pair of elbow pads 120 attaches the assembly 110 onto an instrument platform. A mount plate 130 is disposed upright on the pads 120 substantially perpendicular to the platform. A quad set of three-bladed fans 140 serve to convectively cool the plate 130. Such fans are typically 4½ inches across and rated at 12 $V_{DC}$ for operation. Corner spacers provide a gap between an exemplary calibration board 160 and the mount plate 130. This calibration board 160 measures laser energy for test purposes and can be called a flat plate calorimeter (FPC). The assembly 110 spans about 12 inches across and measures two inches in thickness.

Figure 2A:
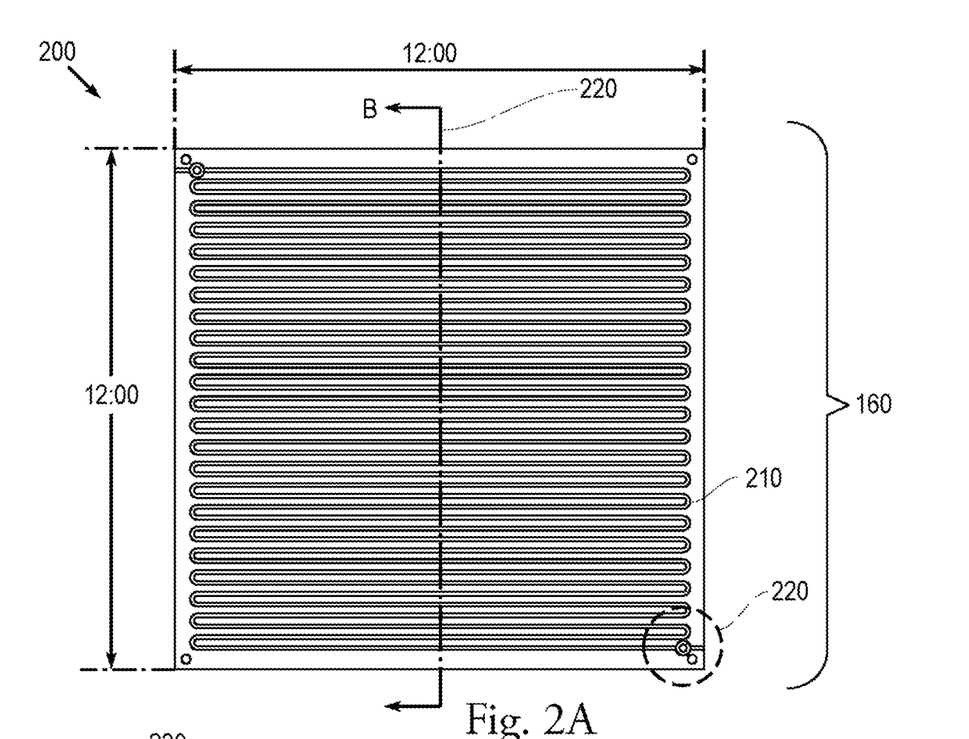
FIGS. 2A and 2B are elevation and isometric views of a calorimeter board.
Figure 2B:
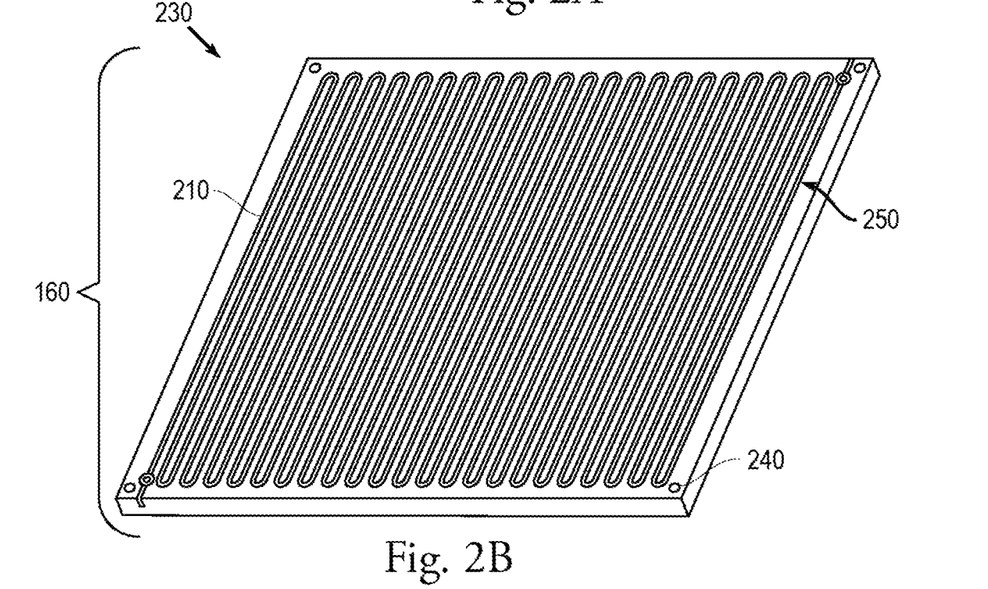

FIG. 2A shows an elevation view 200 of the FPC board 160 for calibration. A serpentine channel 210 on the board 160 extends from one side to its opposite back and forth. A corner circle 220 identifies a detail. FIG. 2B shows an isometric view 230 of the calibration board 160. Four corner holes 240 are disposed on the board 160 by ¼ inch from their corresponding edges. The channel 210 is cut as a groove by milling the board 160 on its reverse surface 250. The board is a half-inch thick, composed of copper (Cu) with a density of 0.324 $lb_m/in^3$ (or 8.96 g/cm³) and weighing about 23.3 $lb_m$.

Figure 3:
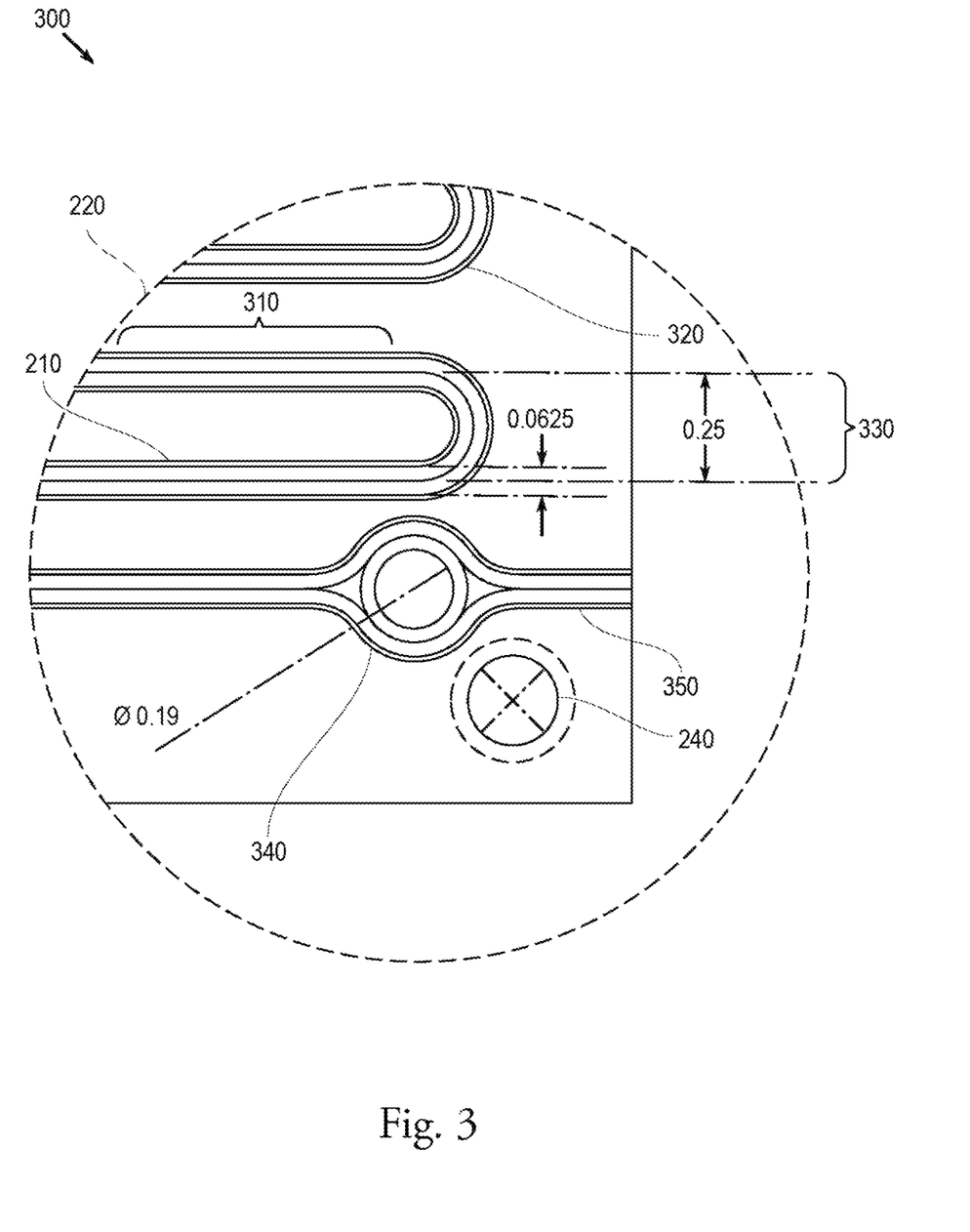
FIG. 3 is a detail elevation view of a board corner.

FIG. 3 shows an elevation detail view 300 of the corner circle 220. The channel 210 includes straight sections 310, connected to its adjacent neighbor by a curve loop 320 separated along their centerlines by a gap 330. A corner sink 340 and edge bleed 350 are disposed near the edges of the board 160. The gap 330 for the exemplary configuration is 0.25 inch, the channels 210 are 0.0625 inch wide and 0.25 inch deep, and the sink 340 has a diameter of 0.19 inch. The channel 210 contains resistance wire that responds by changing resistance in response to temperature change.

Figures 4A, 4B:
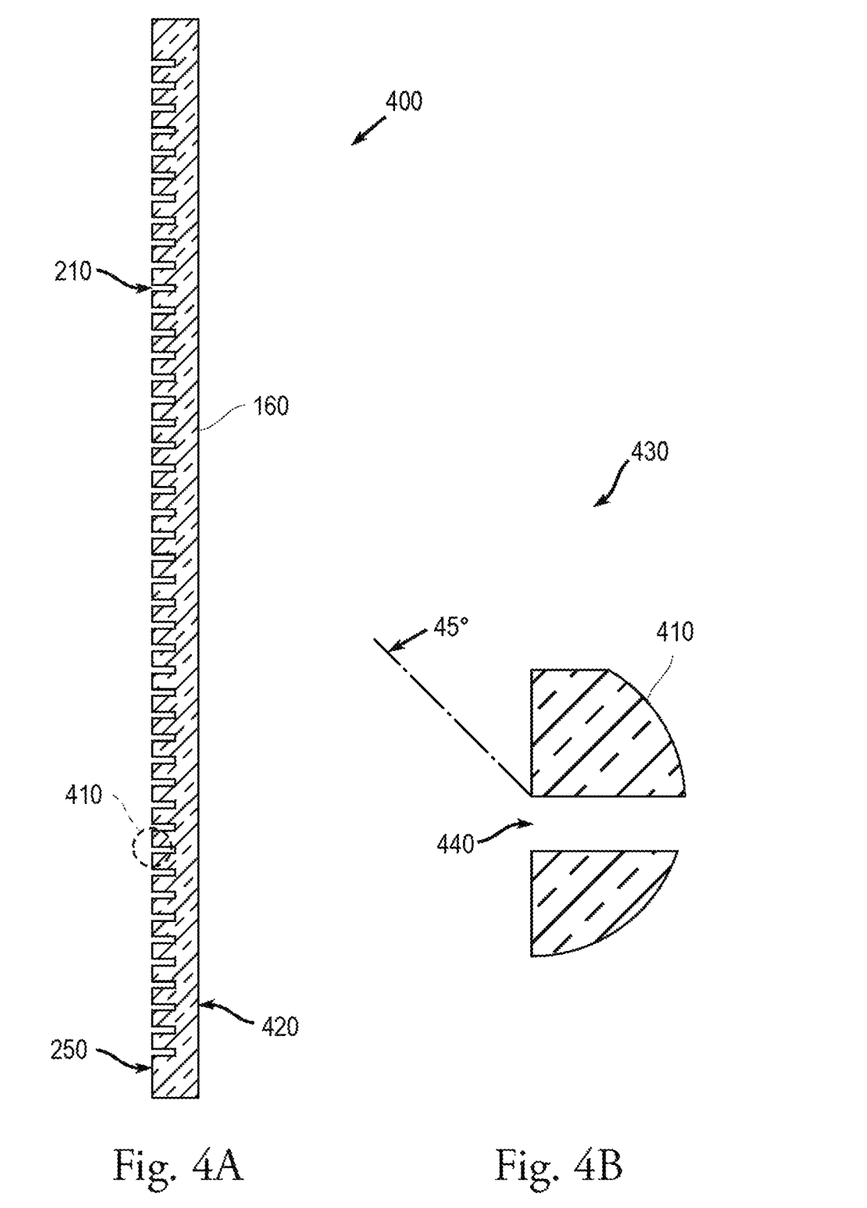
FIGS. 4A and 4B are elevation views of the board.

FIG. 4A shows an elevation cross-section view 400 of the board 160. A surface circle 410 identifies a detail on the reverse surface 250 opposite the obverse surface 420. FIG. 4B shows an elevation detail cross-section view 430 showing the opening 440 for channel 210 with the inlet edge chamfered.

Figure 5:
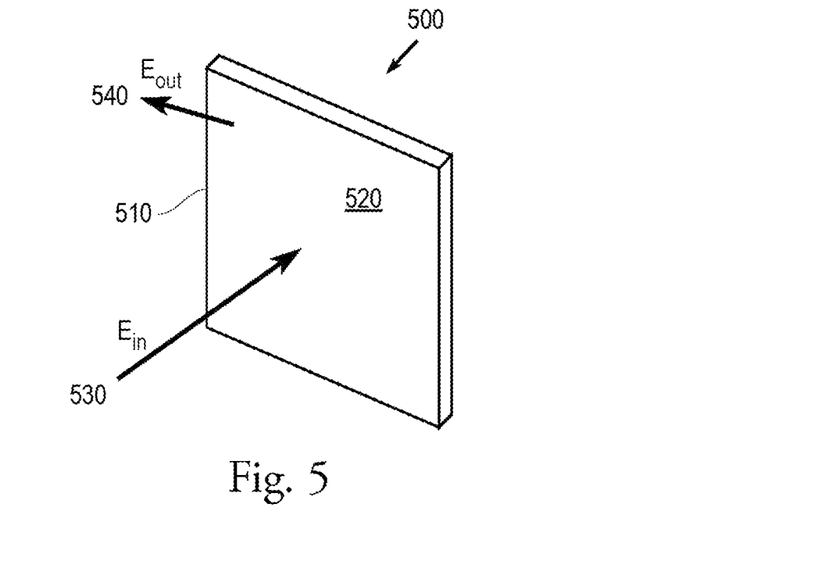
FIG. 5 is an isometric diagram view of a panel.

FIG. 5 shows an isometric diagram view 500 of a panel 510 having an exposure surface 520. The panel 510 receives radiation energy 530 denoted as $E_{in}$ on the surface 520 (analogous to the obverse surface 420 on the FPC board 160, and releases energy 540 denoted as $E_{out}$ from the surface 520. One should note that energy received represents a fraction of that emitted by a radiant source due to reflection. (Optically diffuse surfaces typically reflect a small portion, and can often be treated as a blackbody, whereas specular, i.e., shiny, surfaces can reflect the vast majority of the incoming radiation.)

Exemplary embodiments have been developed to address conditions in which a laser shines on the surface 520 so as to measure net thermal energy from the board 160. A calorimeter relates a change in temperature ΔT to receipt of thermal energy under an energy balance denoting $E_{store}$ as energy increase or decrease:

$$E_{store} = E_{in} - E_{out} \quad (1)$$

Figure 6:
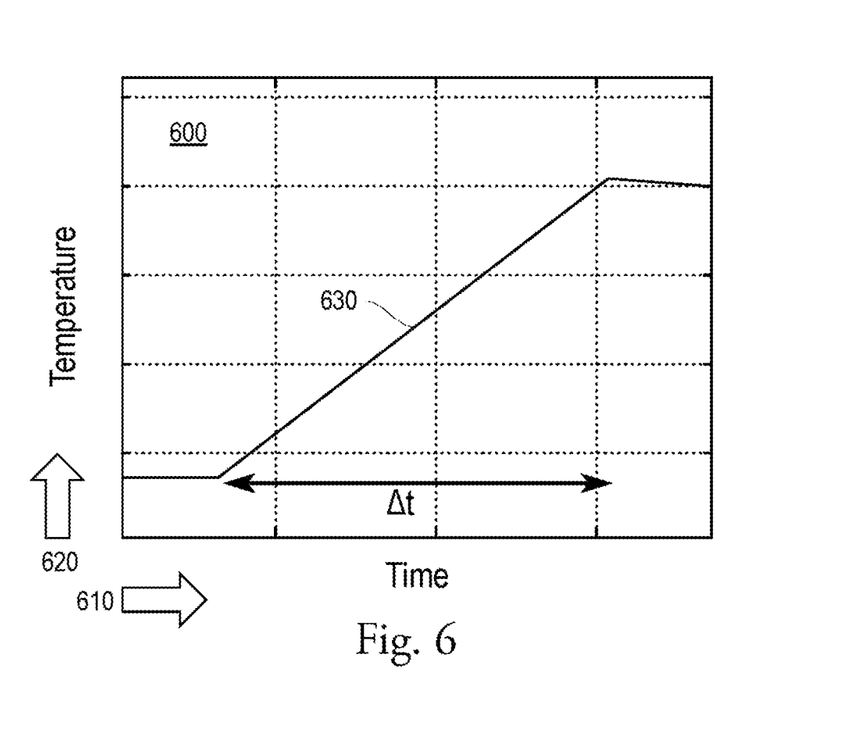
FIG. 6 is a graphical view of temperature transient response.

As an example, for $E_{in}$=12 kJ and $E_{out}$=2 kJ, the resulting additional energy accumulation would be $E_{store}$=10 kJ, thereby causing one kilogram of copper to rise by 26° C. The transient response is illustrated in FIG. 6 as a graphical view 600 of transient temperature response. Time 610 (unscaled) denotes the abscissa while temperature 620 (unscaled) represents the ordinate. A response line 630 shows an interval Δt in which the temperature rises with time.

Figure 7:
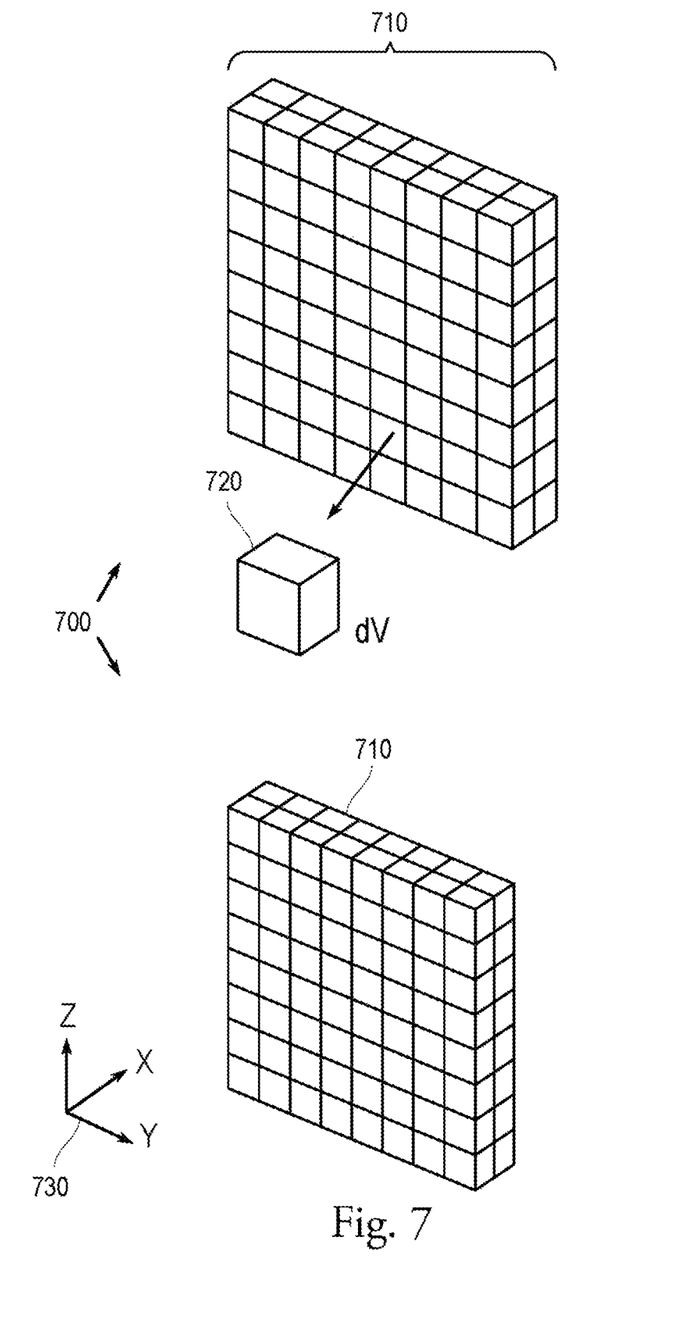
FIG. 7 is an isometric diagram view of a discretized block.

FIG. 7 shows an isometric diagram view 700 of a discretized block 710 composed of an array of discrete sub-volumes 720 depicted as cubes of volume dimension ΔV. A Cartesian coordinate system 730 is illustrated for orientation, showing X as normal to the surface 520, while Y and Z cover width and height of the block 710. The rate of energy storage is proportional to the rate of temperature change, as expressed by:

$$E_{store} = \rho V C \frac{dT}{dt}, \quad (2)$$

where ρ is material density, V is the board's volume, C is heat capacity and dT/dt is the differential of temperature with respect to time. For a differential volume, this stored energy can be differentiated as:

$$dE_{store} = \rho C \frac{dT}{dt} dV, \quad (3)$$

where dV is the differential volume, in the limit as ΔV 720 infinitesimally shrinks. The differential energy stored can be integrated over the time interval by:

$$dE_{store} = \int_{t_1}^{t_2} \rho C \frac{dT}{dt} dV \cong \rho C (T_2 - T_1) dV, \quad (4)$$

where $T_1$ is temperature at $t_1$ and $T_2$ is temperature at $t_2$, while treating heat capacity C as constant. Energy into each differential volume causes a corresponding temperature rise at that location, and the energy dissipates through the volume based on the material's thermal conductivity, which for metals is typically higher than for non-metals.

Figure 8:
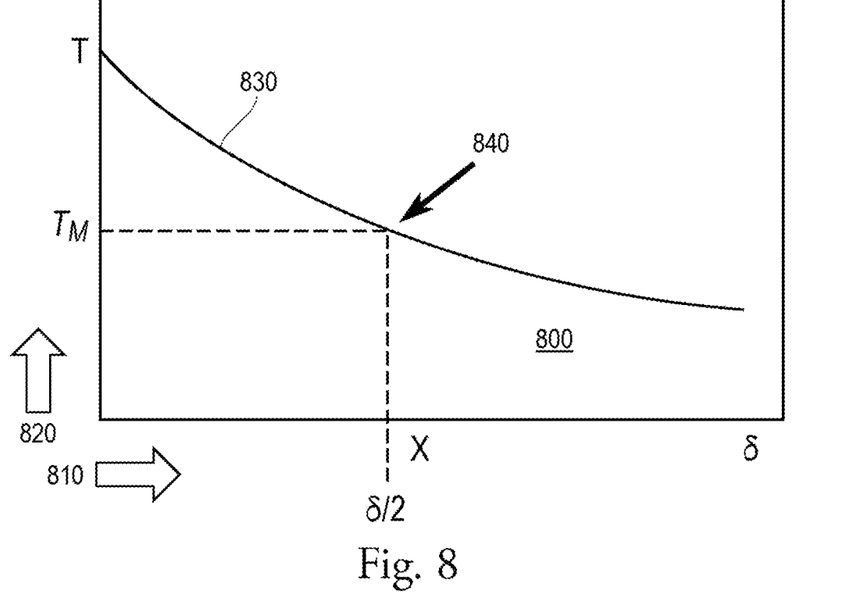
FIG. 8 is a graphical view of temperature penetration response.

FIG. 8 shows a graphical view 800 of temperature versus depth through the material thickness δ. Depth 810 denotes the abscissa while temperature 820 represents the ordinate. The response 830 decreases asymptotically. The depth 810 enables selection of a measurement point 840 at the halfway position δ/2 in relation to the total thickness δ on the graph.

Figure 9A:
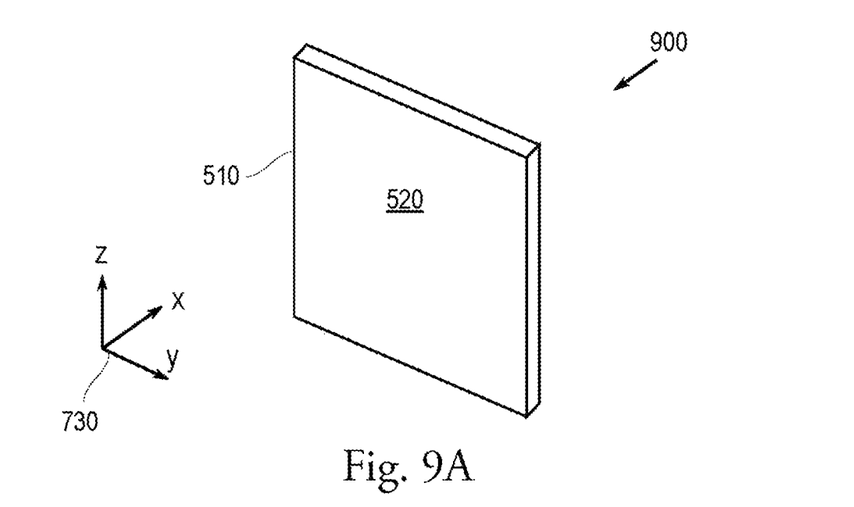
FIGS. 9A and 9B are isometric diagram views of the panel.
Figure 9B:
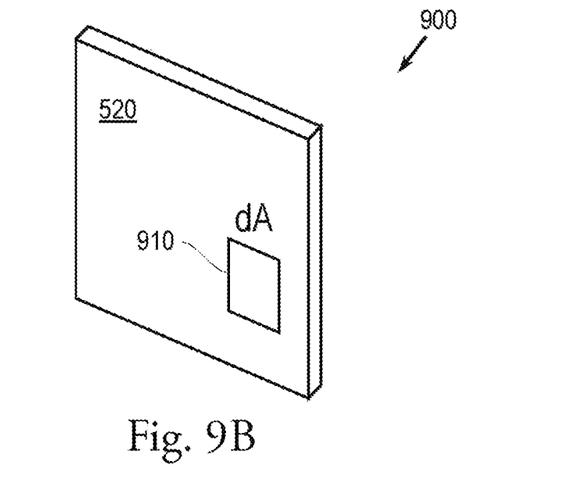

FIGS. 9A and 9B show isometric diagram views 900 of the panel 510 with exposure surface 520 featuring the Cartesian coordinate system 730 for orientation. A discrete area ΔA 910 is shown on the surface 520 that receives and dissipates energy.

Determining total energy gained by the FPC board 160, one sums all the individual discretized volumes by integration:

$$E_{store} = \iiint \rho C (T_2 - T_1) dV. \quad (5)$$

If the temperature is measured at the midplane of the board 160 as $T_M$, one can show that:

$$T_M(y, z) \cong \frac{1}{\delta} \int_0^\delta T \, dx, \quad (6)$$

where δ is thickness of the block 710, and x, y and z represent locations on the surface 520 corresponding to directions of the coordinate system 730. This eliminates one of the spatial integrals in eqn. (5), so as to be rewritten as:

$$E_{store} = \rho C \delta \iint (T_{M,2} - T_{M,1}) dA, \quad (7)$$

where dA represents the infinitesimal discrete area ΔA 910 for the difference in midplane temperatures over the time interval.

These midplane temperatures vary across the planar surface 520, although this can be averaged as $T_{ave}$ across the area based on the definition for a function's average by the aggregate form:

$$T_{ave} = \frac{1}{A} \int \int T dA, \qquad (8)$$

for each time. This yields accumulated energy as:

$$E_{store} = \rho C \delta A (T_{ave,2} - T_{ave,1}). \qquad (9)$$

Replacing T(x,y) integrated over the block 710 with $T_{ave}$ of the panel 510, removes two further spatial integrals. This enables eqn. (9) to be rewritten in simplified form as:

$$E_{store} = mC(T_{ave,2} - T_{ave,1}), \qquad (10)$$

where $m = \rho \delta A$ is the mass of the panel 510. Thus, mC denotes total heat capacity of the panel 510.

Losses must be accounted for, so eqn. (1) can be rewritten as:

$$E_{in} = E_{store} + E_{out}. \qquad (11)$$

One can assume that losses are solely attributable to free convection in the ambient atmosphere, while neglecting blackbody radiation from the panel 510. For differential area dA, this can be expressed as:

$$dE_{out} = h(T - T_\infty) dA, \qquad (12)$$

where h is the convection coefficient and $T_\infty$ is ambient temperature, typically about 20° C. This can be integrated as:

$$E_{out} = h \int \int (T - T_\infty) dy dz \cong hA\left[\frac{1}{A} \int \int T dy dz - T_\infty\right]. \qquad (13)$$

Substituting eqn. (8) into eqn. (13), one obtains:

$$E_{out} \cong hA(T_{ave} - T_\infty). \qquad (14)$$

Figure 10:
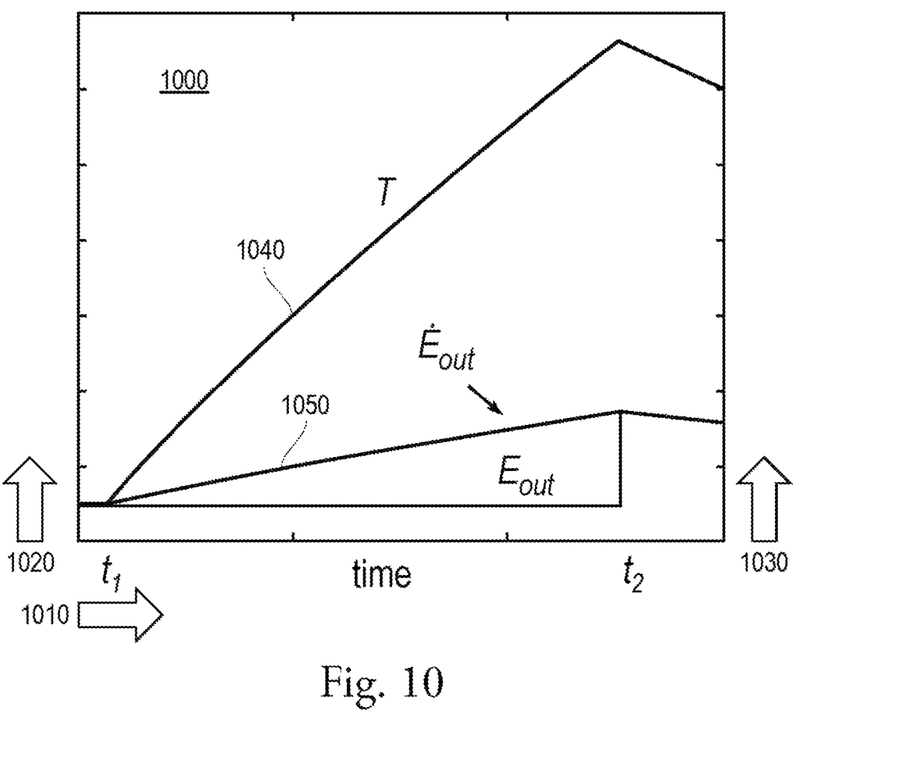
FIG. 10 is a graphical view of temperature and energy transient response.

FIG. 10 shows a graphical view 1000 of transient temperature and output energy. Time 1010 (unscaled) is the abscissa, while temperature 1020 (unscaled) is the left ordinate and energy 1030 (unscaled) is the right ordinate. Plotted curves include temperature response 1040 and release energy change with time response 1050, both increasing proportionally. As conditions vary with time, the transient form becomes:

$$E_{out} = hA \int_{t_1}^{t_2} (T_{ave} - T_\infty) dt. \qquad (15)$$

One can calculate convection coefficient h from cool-down after turning off the laser, after which $E_{in}=0$ and $E_{out}=-E_{store}$. From this, a first order ordinary differential equation can express:

$$mC\frac{dT_{ave}}{dt} = -hA(T_{ave} - T_\infty). \qquad (16)$$

Using an initial average temperature $T_{ave,i}$ immediately after laser shutoff, this can be rewritten as:

$$\frac{T_{ave} - T_\infty}{T_{ave,1} - T_\infty} = \exp\left(-\frac{hA}{mC}t\right), \qquad (17)$$

showing exponential decay with time.

Figure 11:
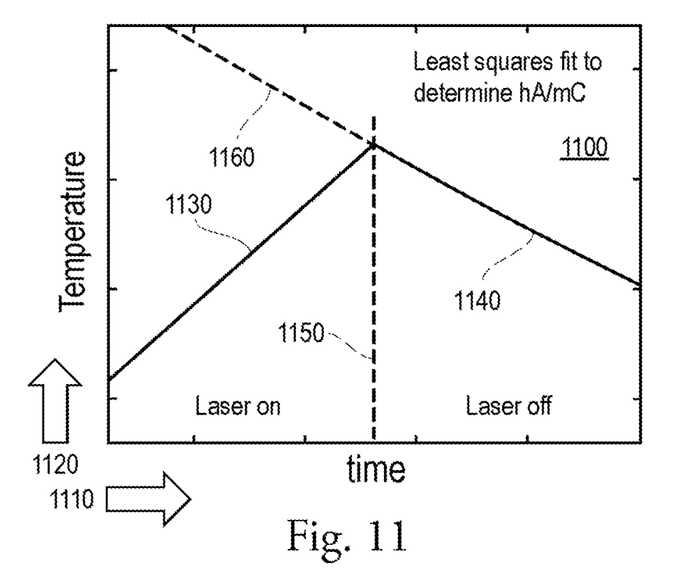
FIG. 11 is a graphical view of heating and cooling responses.

FIG. 11 shows a graphical view 1100 of panel temperature response to laser activation and discontinuance. Time 1110 (unscaled) is the abscissa, while temperature 1120 (unscaled) is the ordinate. Transient temperature response of the board is plotted for when the laser is on 1130 and when laser is off 1140. An event 1150 marks transition time at laser shutoff. An extrapolation curve 1160 follows eqn. (17), which continues as temperature response 1140 after laser shutdown.

Combining equations from analysis yields received energy:

$$E_{in} = mC\left[T_{ave,2} - T_{ave,1} + \frac{hA}{mC}\int_{t_1}^{t_2}(T_{ave} - T_\infty)dt\right]. \qquad (18)$$

These terms can be summarized as:

$$E_{in} = mC[\Delta T_{FPC} + \Delta T_{Losses}] = mC\Delta T_{corrected}, \qquad (19)$$

where $$\Delta T_{FPC} = T_{ave,2} - T_{ave,1}. \qquad (20)$$

and $$\Delta T_{Losses} = \frac{hA}{mC}\int_{t_1}^{t_2}(T_{ave} - T_\infty)dt. \qquad (21)$$

Due to the high relative thermal conductivity of metals used for calorimeters, the temperature distribution across the surface 520 spreads to reduce non-uniformity. Thus from eqn. (8), the double integrals for temperature can be replaced with an average temperature $T_{ave}$ for the panel 510, and by correlation to the FPC board 160. A resistance temperature detector (RTD) can be used to directly measure the average temperature of the FPC board 160. This resistance R can be calculated as:

$$R = \rho_r \frac{1}{A_c}, \qquad (22)$$

where $\rho_r$ is resistivity (not to be confused with material density), and $A_c$ is cross-sectional area. For most metals, resistivity—quantified in ohm-meters—increases with temperature. Across limited ranges, this increase can be treated as linear.

Figure 12:
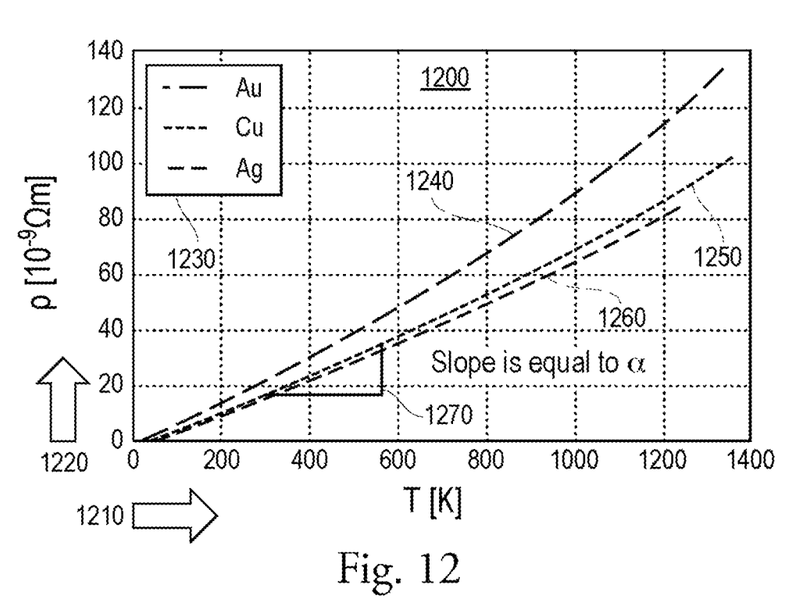
FIG. 12 is a graphical view of resistivity response to temperature.

FIG. 12 shows a graphical view 1200 of temperature sensitivity of metal resistivity. Temperature 1210 (K) denotes the abscissa while resistivity 1220 (Ωm) represents the ordinate. A legend 1230 identifies the plotted resistivity variations for gold 1240, copper 1250 and silver 1260. An example slope for a calibration interval from 250K to 480K demonstrates slope linearity for copper.

Figure 13:
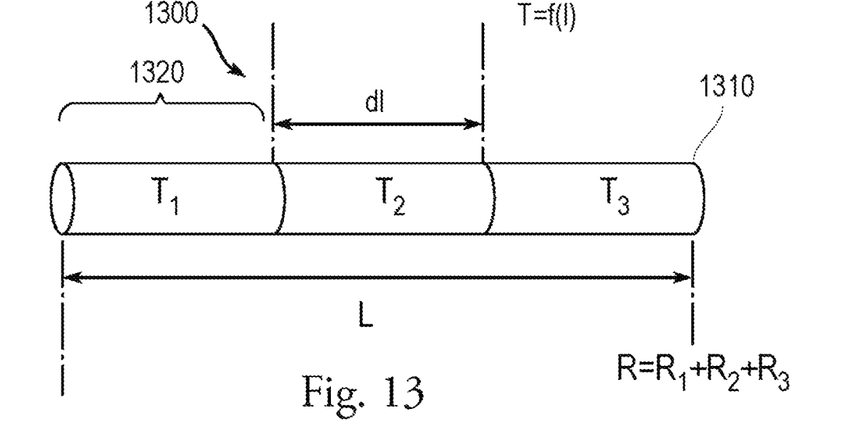
FIG. 13 is an isometric diagram view of wire segmentation.

For variable temperature along an electrically and thermally conductive wire, the total resistance can be found through integration as:

$$R = \int_0^L \frac{\rho_r(T)}{A_c} dl = \int_0^L \frac{\rho_{r0}}{A_c}[1 + \kappa(T - T_0)]dl, \qquad (23)$$

where L is total wire length, dl is the differential increment, $\rho_r(T)$ is resitivity as a function of temperature, $\rho_{r0}$ is a baseline resistivity, $T_0$ is baseline temperature, and $\kappa$ is temperature coefficient, which represents the slope in view 1200. FIG. 13 shows an isometric diagram view 1300 of a linear wire or conduit 1310, which is subdivided into segments 1320, each with a segment temperature. The total wire resistance represents the sum of the resistances for each segment.

Evaluating the integral across leads to the relation:

$$R = \frac{\rho_{r0}}{A_c} L \left(1 - \kappa T_0 + \kappa \frac{1}{L} \int_0^L T \, dl \right) = \frac{\rho_{r0}}{A_c} L(1 - \kappa T_0 + \kappa T_{ave}). \quad (24)$$

Rearranging terms produces the relation:

$$T_{ave} = T_0 + \frac{1}{\kappa}\left(\frac{R}{R_0} - 1\right). \quad (25)$$

Thus, a linear RTD directly measures the average temperature along the length of the wire.

Figure 14:
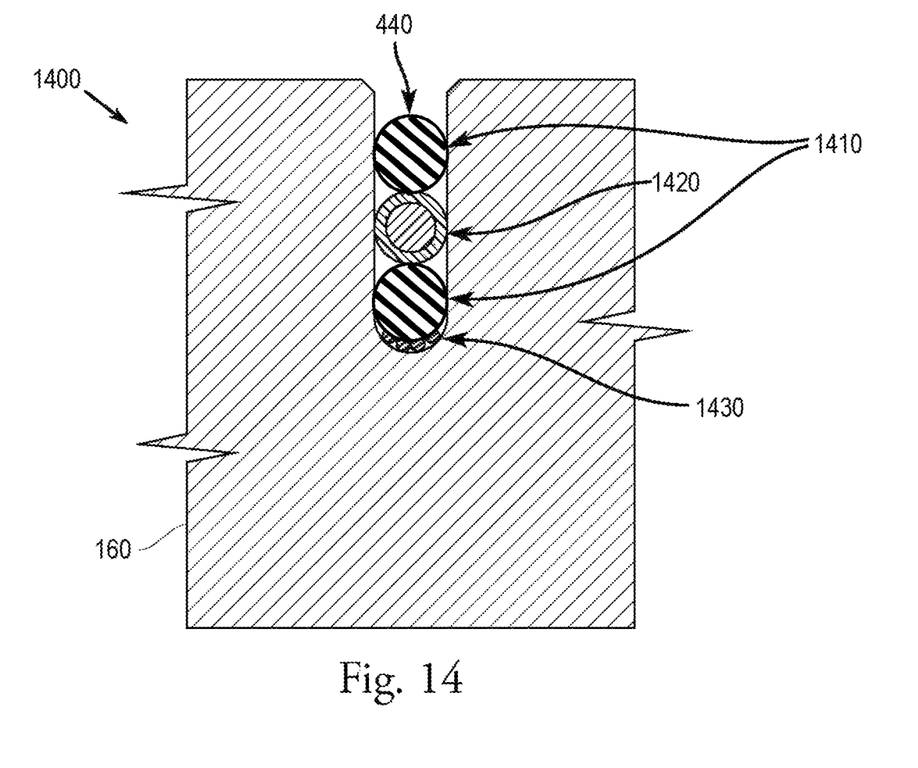
FIG. 14 is an elevation cross-section view of wires in the channel.

The serpentine channel 210 represents a groove milled into the surface 210 of the board 160. FIG. 14 shows an elevation cross-section detail view 1400 of the board 160 at the channel 210 and its opening 440 on the reverse side 250. (Wire size is established by American wire gage or AWG.) A pair of rubber o-ring cords 1410 is snuggly disposed within the channel 210 with an insulated 22AWG calibration heater wire 1420 sandwiched in between. A 30AWG RTD wire 1430 is disposed in four passes between the innermost o-ring cord 1410 and the bottom of the channel 210. The RTD wire 1430 can be looped within the sink 340 to avoid kinking, and its leads exit the board 160 to an ohm meter remotely situated. The cords 1410 and heater wire 1420 are needed primarily for calibration purposes, but also mechanically support the RTD wire 1430 from displacement in the channel 210.

Figure 15:
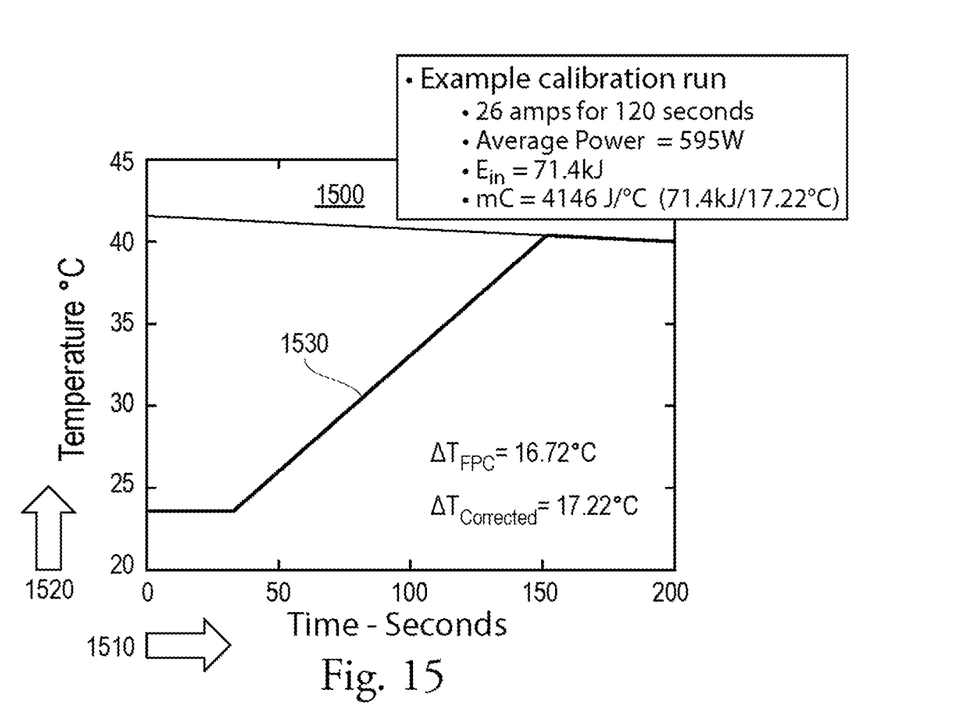
FIG. 15 is a graphical view of a calibration transient response.

FIG. 15 shows a graphical view 1500 of transient temperature response, similar to view 600, but for an example calibration with the FPC board 160 for current at 26 A for 120 s with average power at 595 W. Total heat capacity Time 1510 (s) represents the abscissa, while temperature 1520 (° C.) denotes the ordinate. A response 1530 indicates a rise in temperature during the interval of laser exposure on the surface 520.

These calibration conditions yielded input energy $E_{in}$=71.4 kJ. Over this period, the board's temperature difference was $\Delta T_{FPC}$=16.72° C., and corrected temperature difference was $\Delta T_{corrected}$=17.22° C. Total heat capacity from eqn. (19) was mC=$E_{in}/\Delta T_{corrected}$=71.4 kJ/17.22° C.=4.146 kJ/° C.

Figure 16:
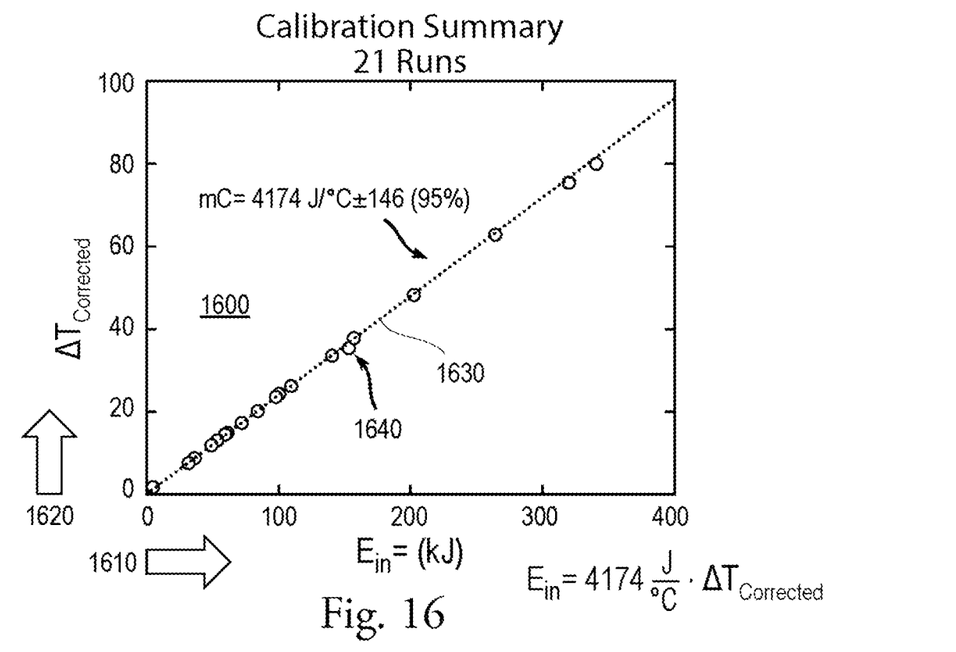

FIG. 16 shows a graphical view 1600 of the calibration survey in view 1500. Received energy 1610 (kJ) denotes the abscissa while corrected temperature difference 1620 (° C.) represents the ordinate. A response 1630 plots curve-fit measurements 1640 from twenty-one experimental runs. A trend line for the response 1630 can be expressed as mC=4.174 kJ/° C.±0.146 kJ/° C. (95%) for total heat capacity with excellent consistency.

Figure 17:
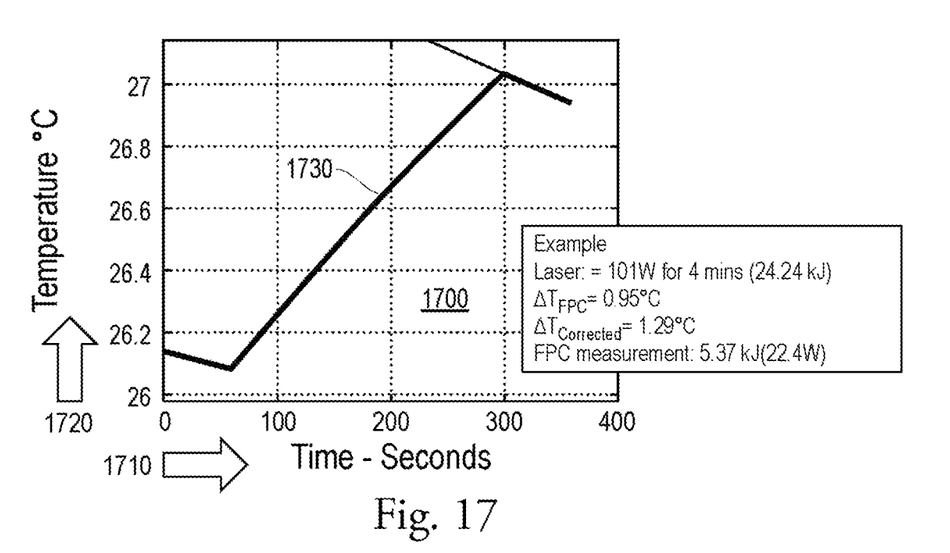
FIG. 17 is a graphical view of a laser emission transient response.

FIG. 17 shows a graphical view 1700 of transient temperature response for laser exposure at 0.101 kW for four minutes for a total input energy of $E_{store}$=24.24 kJ. Time 1710 represents the abscissa while temperature 1720 provides the ordinate. The response 1730 shows a linear temperature rise during laser activation and cool-down thereafter. The resulting temperature differences were $\Delta T_{FPC}$=0.95° C. and $\Delta T_{corrected}$=1.29° C., with FPC measurement of acquired energy as $E_{store}$=5.37 kJ from absorption of 22.4 W.

Figure 18:
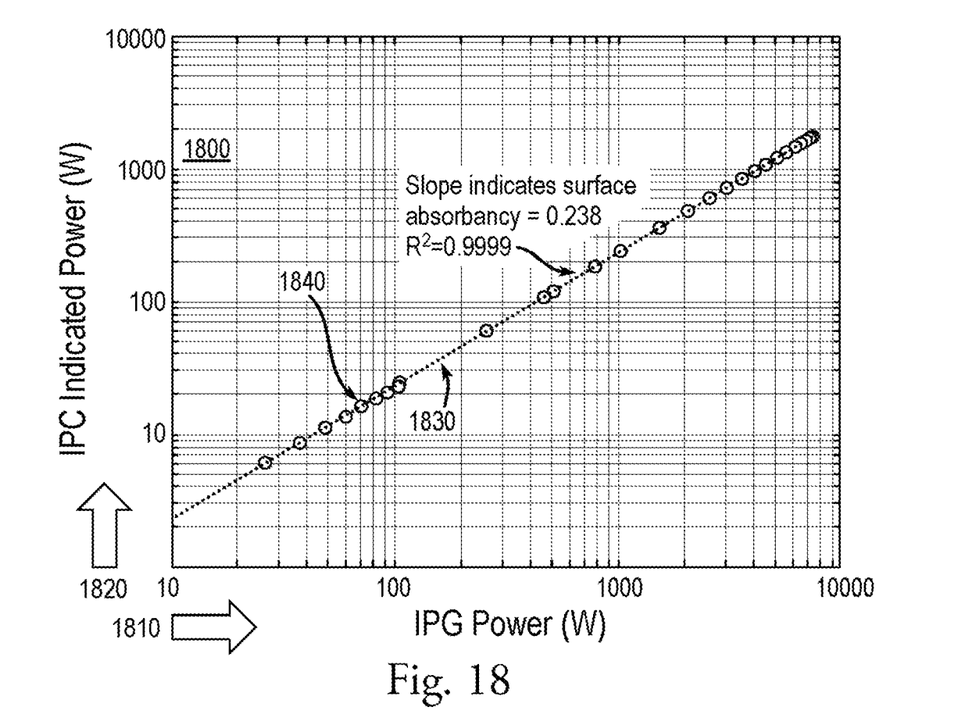
FIG. 18 is a graphical view of a calibration correlation.

The FPC board 160 was tested with three different fiber lasers from IPG Photonics in Oxford, Mass. at powers spanning from 25 W to 7.5 kW. FIG. 18 shows a graphical view 1800 of power response. Applied IPG power 1810 (W) denotes the abscissa while indicated FPC power 1820 (W) represents the ordinate. A response 1830 plots a curve-fit of the measurements 1840 showing linear correlation between the input power and that measured with highly linear correlation across three orders of magnitude for input emission power. The response 1830 has a slope of surface absorptivity $\alpha$=0.238 that matches the measurements 1840 with $R^2$=0.9999.

Figure 19:
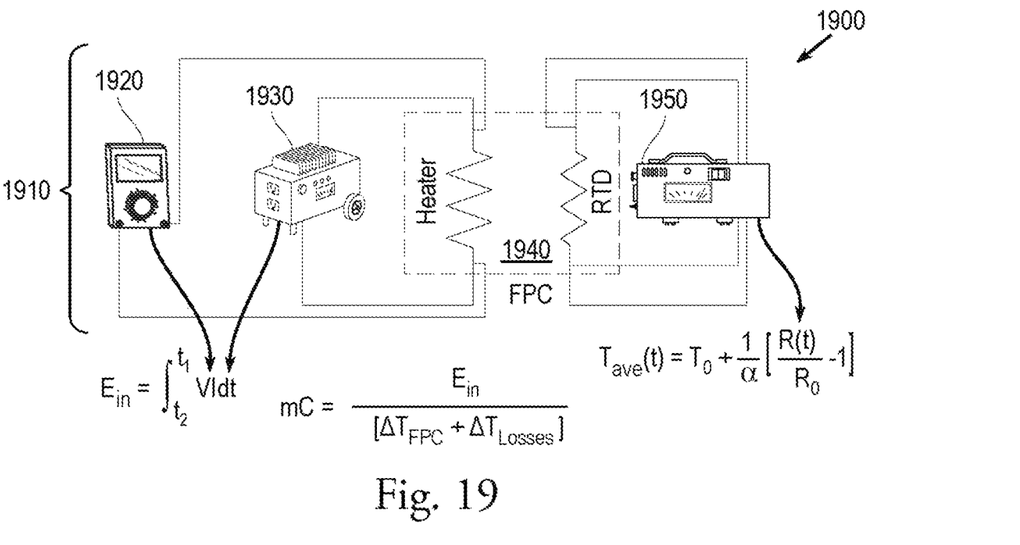
FIG. 19 is a schematic view of a calibration test configuration.

FIG. 19 shows a schematic view 1900 of a calibration equipment assembly 1910. The FPC board 160 is subject to a built-in heater to deposit a precisely measured quantity of electrical energy. The total apparatus includes a volt meter 1920, a power supply 1930, a heat exchanger 1940, a resistance meter 1950. Input energy $E_{in}$ for the volt meter 1920 and power supply 1930 are governed by the relation:

$$E_{in} = \int_{t_1}^{t_2} VI \, dt, \quad (26)$$

where V is voltage potential and I is electric current. Total heat capacity of the FPC board 160 is governed by the relation:

$$mC = \frac{E_{in}}{\Delta T_{FPC} + \Delta T_{Losses}}. \quad (27)$$

Transient average temperature for the four-wire ohm meter 1950 is governed by eqn. (25).

Figure 20:
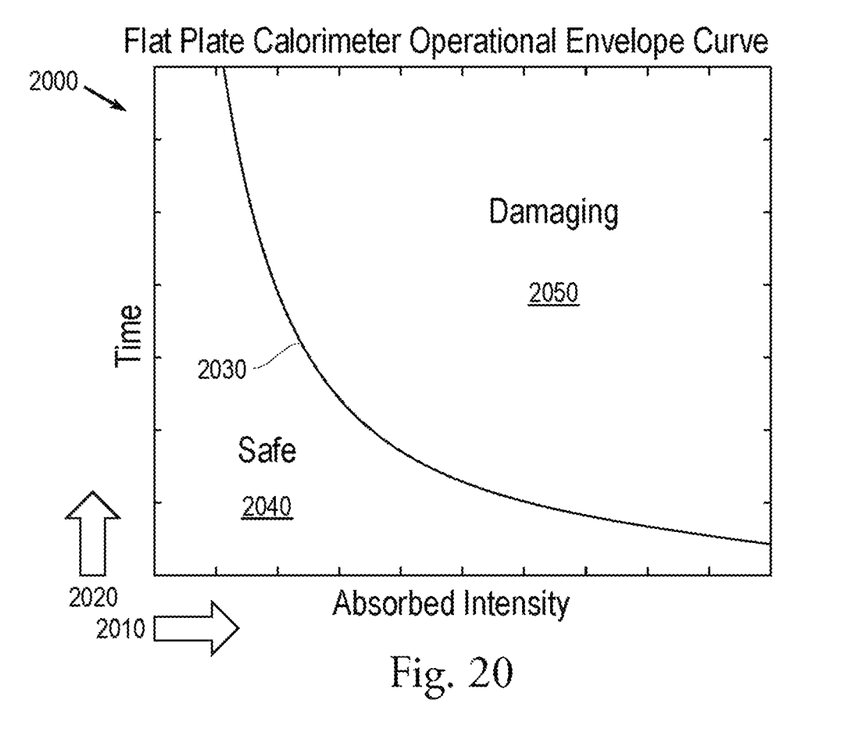
FIG. 20 is a graphical view of an operational intensity exposure envelope.

The FPC board 160 can be damaged if the surface gets too hot. This hazard depends on the derived intensity of power-per-area (W/cm²) and duration, as well as absorptivity. A more reflective surface increases the permissible exposure intensity, and can be augmented by gold (Au) or silver (Ag) plating. Greater absorptivity increases sensitivity, such as Ebonol C black oxide coating. FIG. 20 shows a graphical view 2000 of operational conditions. Absorption intensity 2010 (unscaled) represents the abscissa, while time 2020 (unscaled) denotes the ordinate. The threshold curve 2030 divides the safe region 2040 from the unsafe region 2050.

Figure 21:
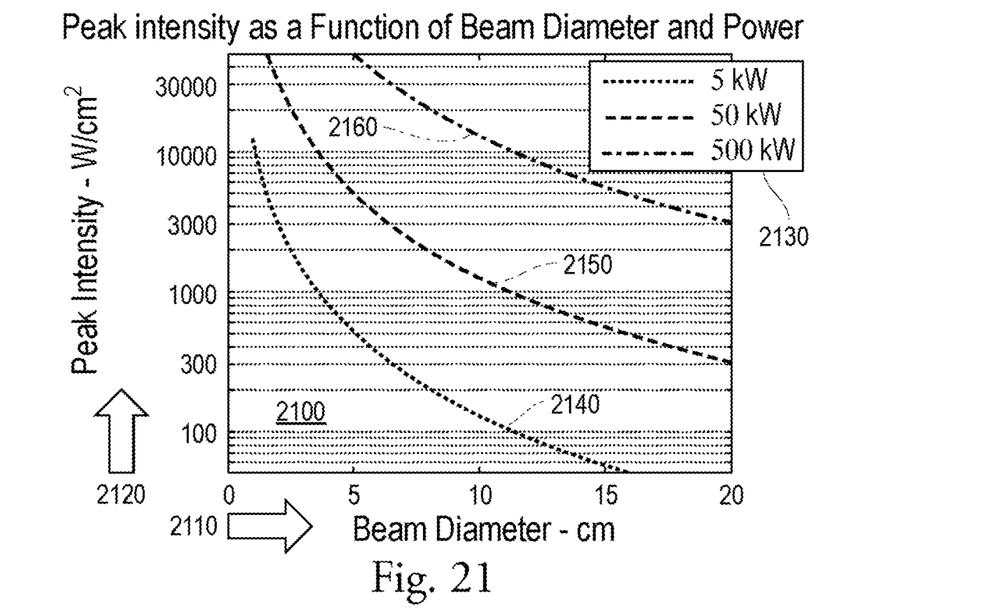
FIG. 21 is a graphical view of intensity thresholds with laser beam diameter.

Intensity is a derived function of received power from the laser and spot size, i.e., the area illuminated by the laser, which can vary with distance between laser and target. FIG. 21 shows a graphical view 2100 of peak intensity as a function of beam diameter and power, assuming a Gaussian distribution. Beam diameter 2110 (cm) presents the abscissa, while beam intensity 2120 denotes the ordinate. A legend 2130 identifies threshold curves 2030 based on their indicated power levels: 5 kW as 2140, 50 kW as 2150 and 0.5 MW as 2160.

Figure 22:
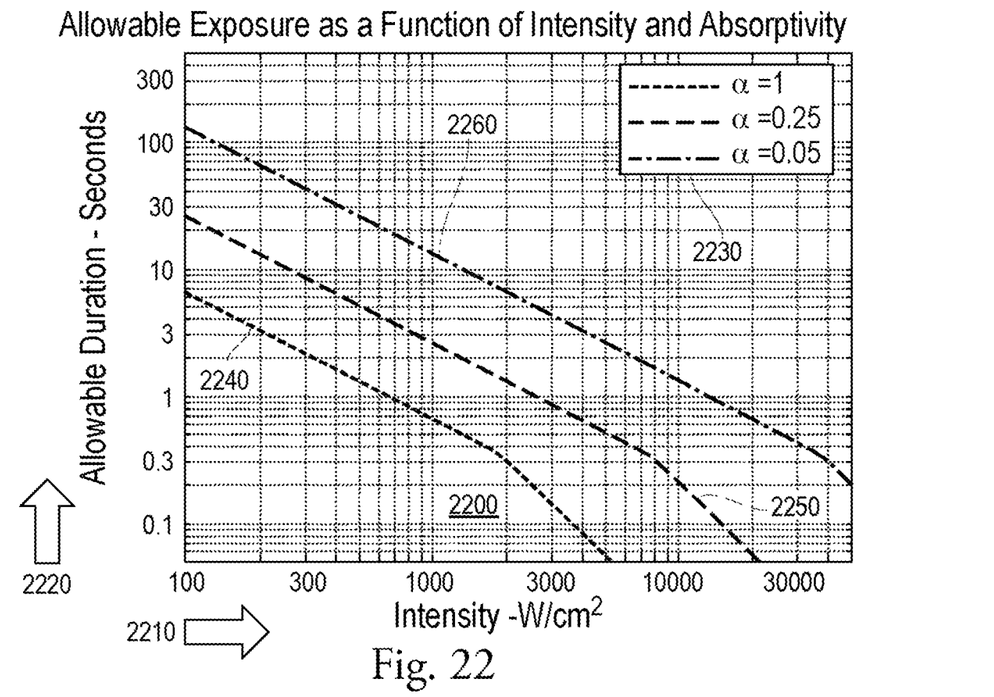
FIG. 22 is a graphical view of threshold duration with intensity.

FIG. 22 shows a graphical view 2200 of permissible exposure. Input intensity 2210 (W/cm²) in logarithmic scale represents the abscissa, while duration 2220 (s) also in logarithmic scale indicates the ordinate. A legend 2230 identifies threshold curves 2030 for absorptivity values: 1.0 as 2240, 0.25 as 2250 and 0.05 as 2260. The acceptable region below the threshold increases as absorptivity decreases from blackbody 2240 to high reflectivity 2260. To extend the acceptable region to the maximum practical, the obverse surface 420 is geometrically flat with a smooth polished finish. The reverse side 250 faces the support plate 130 and can be comparatively untreated.

The exemplary FPC board 160 provides highly linear correlation of measured input power in response to emission power from a laser source. This development facilitates accurate testing of laser exposure for calibration of an empirical evaluation to subject specimens.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A calorimeter board for power calibration of a laser emission, said board comprising:
    a flat metal plate having obverse and reverse surfaces separated by a thickness;
    a sinuous groove cut into said reverse surface penetrating to a depth being part of said thickness; and
    a resistance temperature detector wire is disposed within said groove at said depth, wherein said wire connects to an instrument that measures electrical resistance responsive to the laser emission on said obverse surface.

2. The board according to claim 1, wherein the plate is composed of copper.

3. The board according to claim 1, wherein said depth is one-half of said thickness.

4. The board according to claim 1, wherein said wire passes four times within said groove.

5. The board according to claim 1, wherein said wire is maintained by a cord that fits snuggly in said channel.

6. The board according to claim 1, wherein said channel extends from one side of the board to its opposite and loops back again.

7. The board according to claim 1, wherein a mount plate attaches to the board by spacers for securing to an instrument platform.

8. The board according to claim 1, wherein said obverse surface has a polished finish.

* * * * *